United States Patent
Edwards, III et al.

(10) Patent No.: US 11,922,174 B2
(45) Date of Patent: Mar. 5, 2024

(54) MANAGEMENT CONTROLLER REQUESTS IN A UEFI PRE-BOOT ENVIRONMENT OF AN INFORMATION HANDLING SYSTEM

(71) Applicant: Dell Products L.P., Round Rock, TX (US)

(72) Inventors: William C Edwards, III, Round Rock, TX (US); Aniruddha Suresh Herekar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/716,385

(22) Filed: Apr. 8, 2022

(65) Prior Publication Data

US 2023/0325202 A1 Oct. 12, 2023

(51) Int. Cl.
*G06F 9/4401* (2018.01)

(52) U.S. Cl.
CPC .......... *G06F 9/4411* (2013.01); *G06F 9/4403* (2013.01); *G06F 9/4416* (2013.01)

(58) Field of Classification Search
CPC ..... G06F 9/4411; G06F 9/4403; G06F 9/4416
See application file for complete search history.

(56) References Cited

U.S. PATENT DOCUMENTS

| | | | |
|---|---|---|---|
| 2006/0161793 A1* | 7/2006 | Orr | G06F 1/325 713/300 |
| 2016/0132322 A1* | 5/2016 | Jones | G06F 9/445 717/168 |
| 2016/0202964 A1* | 7/2016 | Butcher | G06F 8/654 717/172 |
| 2017/0270301 A1* | 9/2017 | Vidyadhara | G06F 9/4411 |
| 2019/0384614 A1* | 12/2019 | Kondapi | G06F 9/4408 |
| 2020/0042710 A1 | 2/2020 | Liu et al. | |
| 2020/0310774 A1 | 10/2020 | Zhu et al. | |
| 2021/0286692 A1* | 9/2021 | Chien | G06F 11/2284 |
| 2023/0119437 A1* | 4/2023 | Faasse | G06F 1/324 713/300 |

* cited by examiner

*Primary Examiner* — Aurel Prifti
(74) *Attorney, Agent, or Firm* — Larson Newman, LLP

(57) ABSTRACT

An information handling system includes a Unified Extensible Firmware Interface (UEFI) and a management controller. The management controller establishes a communication channel with the UEFI, and provides a memory path associated with a driver associated with an operation to be performed in the UEFI. Based on the memory path, the UEFI receives the requested driver from a memory associated with the UEFI, and loads the requested driver. The UEFI executes the loaded requested driver, and provides an execution status for executed driver to the management controller.

18 Claims, 5 Drawing Sheets

MANAGEMENT CONTROLLER REQUESTS IN A UEFI PRE-BOOT ENVIRONMENT OF AN INFORMATION HANDLING SYSTEM

FIELD OF THE DISCLOSURE

The present disclosure generally relates to information handling systems, and more particularly relates to handling management controller requests in a UEFI pre-boot environment of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a management controller that may establish a communication channel with a Unified Extensible Firmware Interface (UEFI), and provide a memory path associated with a driver associated with an operation to be performed in the UEFI. Based on the memory path, the UEFI may receive the requested driver from a memory associated with the UEFI, and load the requested driver. The UEFI may execute the loaded requested driver, and provide an execution status for executed driver to the management controller.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
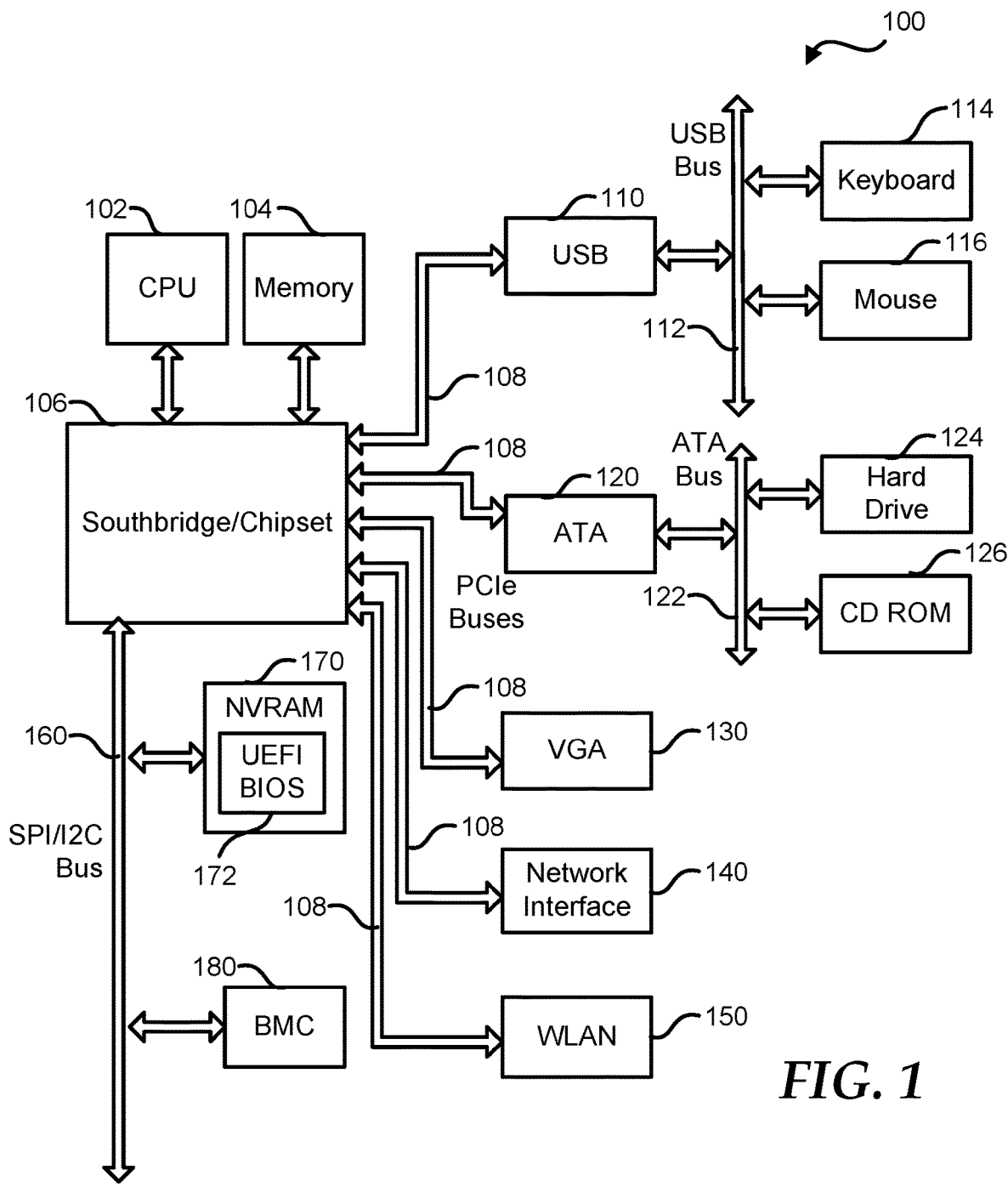
FIG. 1 is a block diagram of an information handling system according to an embodiment of the present disclosure.

FIG. 1 illustrates an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (MC) 140, a wireless local area network (WLAN) controller 150, a serial peripheral interface (SPI) bus 160, a flash memory device 170 for storing UEFI BIOS code 172, a trusted platform module (TPM) 180, and a baseboard management controller (EC) 190. EC 190 can be referred to as a service processor, and embedded controller, and the like. Flash memory device 170 can be referred to as a SPI flash device, BIOS non-volatile random access memory (NVRAM), and the like. EC 190 is configured to provide out-of-band access to devices at information handling system 100. As used herein, out-of-band access herein refers to operations performed without support of CPU 102, such as prior to execution of UEFI BIOS code 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems. In another embodiment, EC 190 can provide aspects of a hardware root of trust. The root of trust relates to software processes and/or hardware devices that ensure that firmware and other software necessary for operation of an information handling system is operating as expected.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

UEFI BIOS code 172 can be referred to as a firmware image, and the term BIOS is herein used interchangeably with the term firmware image, or simply firmware. In an embodiment, UEFI BIOS 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

UEFI BIOS code 172 includes instructions executable by CPU 102 to initialize and test the hardware components of system 100, and to load a boot loader or an operating system (OS) from a mass storage device. UEFI BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

The storage capacity of SPI flash device 170 is typically limited to 32 MB or 64 MB of data. However, original equipment manufacturers (OEMs) of information handling systems may desire to provide advanced firmware capabilities, resulting in a BIOS image that is too large to fit in SPI flash device 170. Information handling system can include other non-volatile flash memory devices, in addition to SPI flash device 170. For example, memory 104 can include non-volatile memory devices in addition to dynamic random access memory devices. Such memory is referred to herein as non-volatile dual in-line memory module (NVDIMM) devices. In addition, hard drive 124 can include non-volatile storage elements, referred to as a solid state drive (SSD). For still another example, information handling system 100 can include one or more non-volatile memory express (NVMe) devices. Techniques disclosed herein provide for storing a portion of a BIOS image at one or more non-volatile memory devices in addition to SPI flash device 170.

Figure 2:
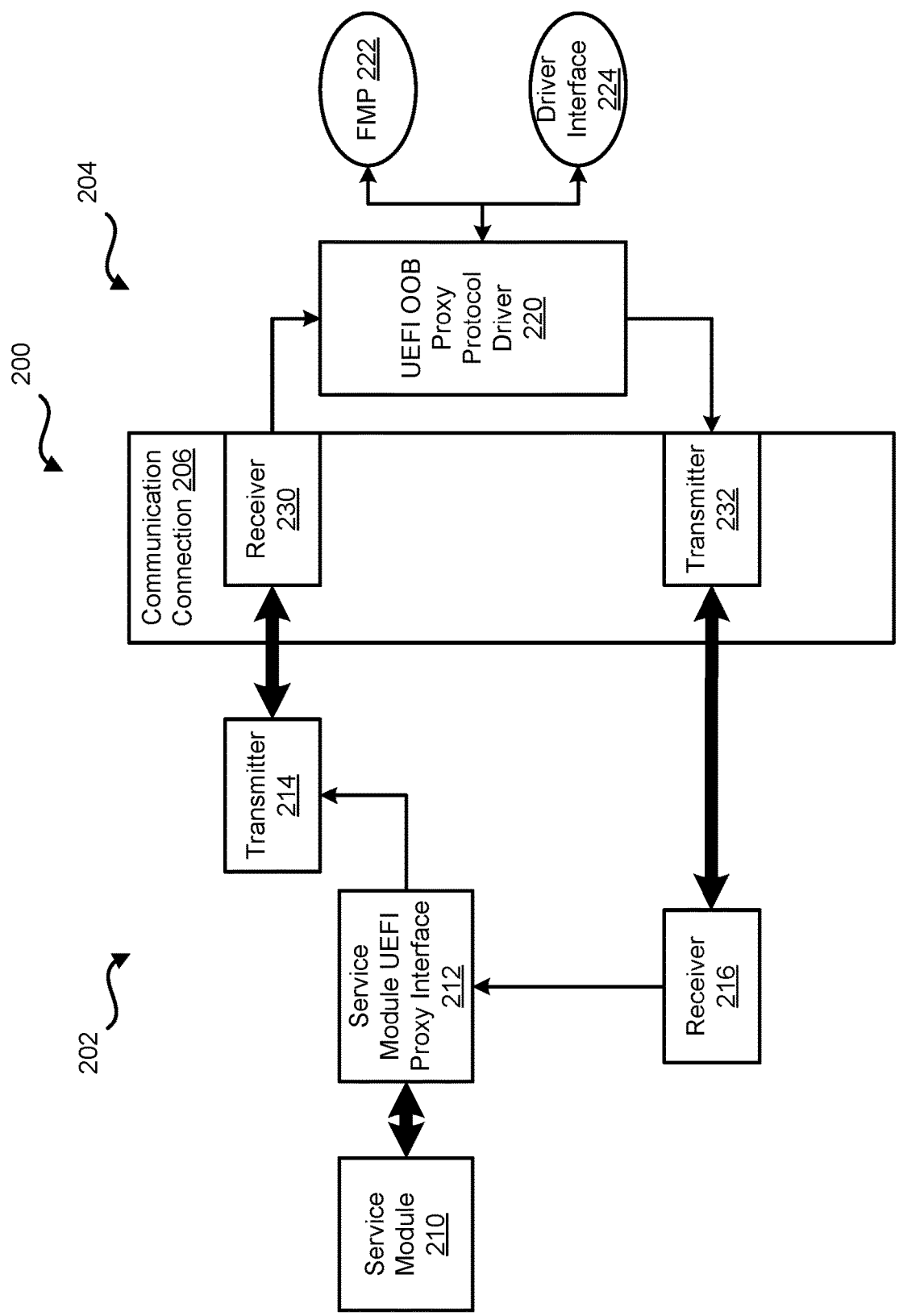
FIGS. 2 and 3 are block diagrams of different environments of the information handling system according to another embodiment of the present disclosure.
Figure 3:
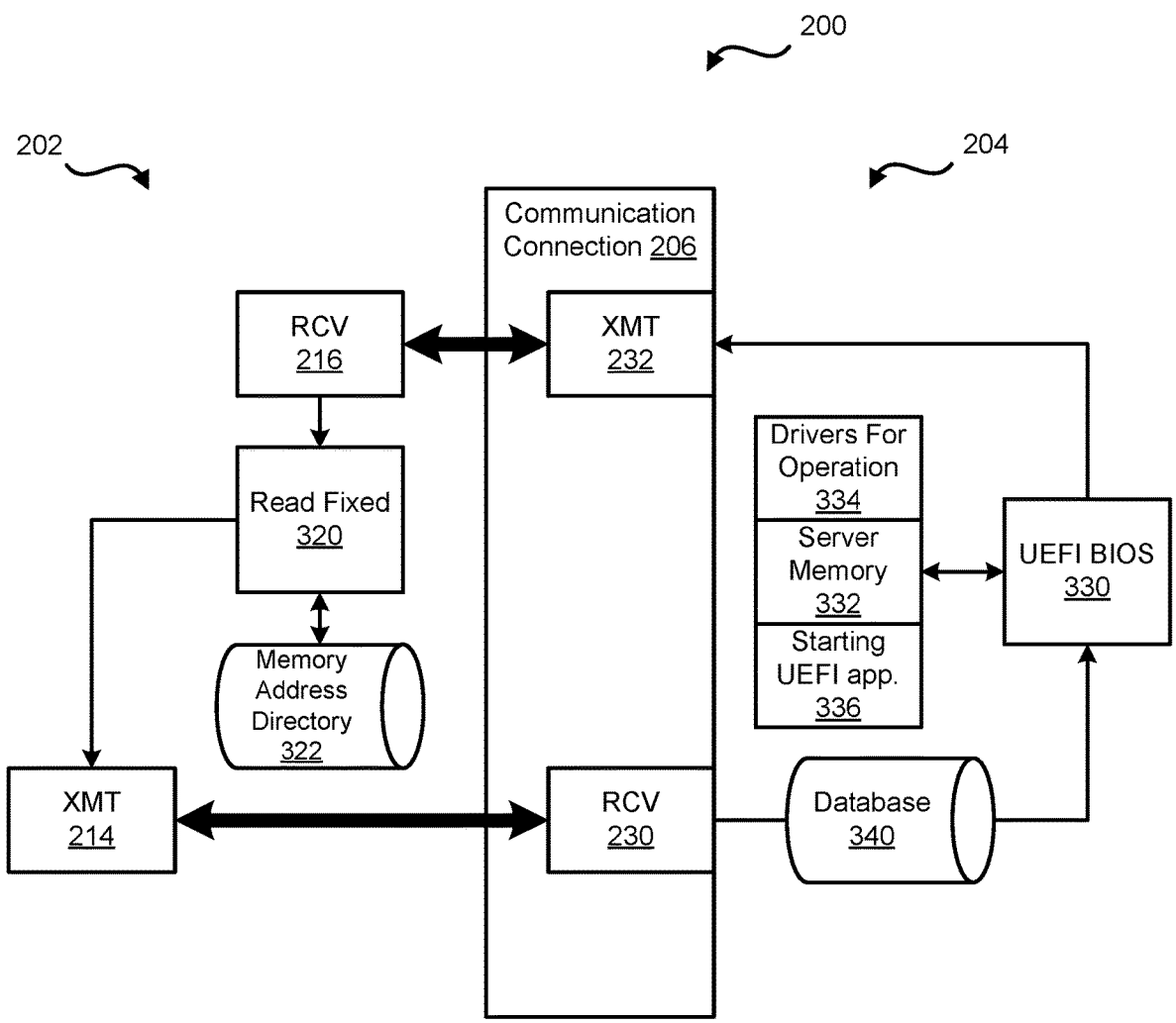

FIGS. 2 and 3 illustrate portions of an information handling system 200 according to another embodiment of the present disclosure. Information handling system 200 includes a management controller 202 and a pre-boot system management controller 204. In an example, management controller 202 may be any suitable environment for performing operations associated with a pre-boot of information handling system, such as an out-of-band (OOB) management controller. Components within management controller 202 may communicate with components within pre-boot management environment 204 via a communication connection 206. Management controller 202 includes any suitable number of components including, but not limited to, service module 210, service module UEFI proxy interface 212, transmitter 214, and receiver 216. In an example, service module 210 may be any suitable component to integrate an OS with management controller 202, such as an Integrated System Service Manager (iSSM). In certain examples, management controller 202 may be any suitable component to provide access to different devices of information handling system 200, such as a Dell Remote Access Controller (iDRAC). Pre-boot management environment 204 includes any suitable number of components including, but not limited to, a UEFI 00B proxy protocol driver 220, a firmware management protocol (FMP) 222, and a driver interface 224. In an example, driver interface 224 may be any suitable interface or protocol to enable one or more drivers to be loaded within the UEFI of information handling system 200. For example, driver interface 224 may be a UEFI driver provided by a vendor, something that was loaded during Proxy initialization or by the proxy if the request required it, or the like. In an example, if driver interface 224 is a UEFI driver, the driver interface may include FMP 222. In certain example, a particular driver may support driver interface 222, or the driver interface may be a translator of an interface/protocol to indicate or control how the device driver actually performs an operation. Communication connection 206 includes a receiver 230 and a transmitter 232. In certain examples, management controller 202 and pre-boot management environment 204 may include additional components not illustrated in FIGS. 2-4 without varying from the scope of this disclosure.

During a pre-boot operation of previous information handling systems, UEFI may load more drivers or applications than needed to accomplish tasks. For example, an entire task processing subsystem must be present within the UEFI. In this example, based on a large number of drivers or applications being loaded, a simple task or few tasks may wait for all initialization of information handling system to complete before the actual operation commences. Additionally, in these previous information handling systems, a management controller may not have a management over or connection to the UEFI that may be used for pre-boot operations. In an example, a UEFI environment may provide a framework where devices can be communicated with for such pre-boot operations. However, previous information handling system may not have an ability to provide the management controller with access to and manageability of the UEFI environment during pre-boot operations. Previous information handling systems may require all the UEFI applications and drivers to be loaded for possible use. These previous information handling systems may also require an application to have the code for all possible usages along with a separation of operation processing. However, storage of data for all possible pre-boot operations may increase the time required to load and execute the pre-boot operations, especially if the pre-boot operations are very simple and need very little of the data loaded and initialized.

Service module UEFI proxy interface 212 of management controller 202 may improve information handling system 200 by loading and initializing as minimal of a data set as possible to perform the pre-boot operations. In an example, loading and initializing a minimal amount of data may improve the execution time by reducing an amount time it takes to perform certain operations. Additionally, service module UEFI proxy interface 212 of management controller 202 may improve information handling system 200 by reducing memory consumption within UEFI by loading only the required UEFI drivers and applications. In an example, service module UEFI proxy interface 212 may only load the drivers that needed for support of an execution of a task manager with a task list to perform one or more tasks. Also, only small amounts of data may be transmitted between management controller 202 and pre-boot management environment 204, such as a task list, status information as tasks are executed, or the like.

Referring now to FIG. 2, management controller 202 may be pre-loaded with service module UEFI proxy interface 212 and the service module UEFI proxy may create one or more communication channels between service module 210 and UEFI OOB proxy protocol driver 220. In an example, one communication channel may be created via transmitter 214 and receiver 230, and another communication channel may be created via transmitter 232 and receiver 216. In this example, service module UEFI proxy interface 212 may provide data from service module 210 to pre-boot management environment 204 via transmitter 214 and receiver 230 of communication connection 206. Pre-boot management environment 204 may provide response data to service module 210 via transmitter 232, receiver 216, and service module UEFI proxy interface 212.

During pre-boot operations, UEFI pre-boot management environment 204 may communicate with management controller 202, via service module UEFI proxy interface 212, to request that UEFI OOB proxy protocol driver 220 be loaded. In an example, based on the load request for UEFI OOB proxy driver 220, management controller 202 may provide the proxy driver from a storage area accessible and managed by management controller 202, and UEFFBIOS may load the proxy driver within UEFI environment 204. In certain examples, driver interface 224 may interface with the storage area to identify the UEFI OOB proxy driver 220. In response to UEFI OOB proxy protocol driver 220 being loaded, service module UEFI proxy interface 212 on the management controller 202 and UEFI OOB proxy protocol 220 on UEFI environment 204 may act as proxy drivers for their respective components. In an example, UEFI OOB proxy protocol driver 220 may perform one or more operations for UEFI environment 204 including, but not limited to, a communication interface with management controller 202, and a boot loader for the UEFI pre-boot operations.

During the pre-boot operations of UEFI/BIOS, one or more operations may need to be performed that needs a particular driver or application. Based on the driver or application needed to be loaded within the UEFI environment 204, UEFI OOB proxy protocol driver 220 may requests details for the driver or application from service module UEFI proxy interface 212. In an example, the details for the driver or application may be any suitable data including, but not limited to, a memory path for the requested driver or application. Based on the request, service module UEFI proxy interface 212 may provide data to UEFI via UEFI OOB proxy protocol driver 220 as needed for a current operation. For example, if a particular card, such as a PCIe card, within information handling system 200 needs a BIOS firmware update, service module proxy interface 212 may provide a small amount of data with the memory path associated with a memory address for a firmware update image to UEFI OOB proxy protocol driver 220. In an example, service module UEFI proxy interface 212 may utilize a memory map directory within management controller 202 to retrieve and send the memory address to the UEFI OOB proxy.

Based on the memory address, UEFI OOB proxy 220 may utilize driver interface 224 to load the firmware update and an associated driver within UEFI environment 204. In response, UEFI OOB proxy 220 may enable the driver to control the firmware update and communicate with FMP 222, which in turn may perform the firmware update on the PCIe device. During the firmware update operation, the driver and FMP 222 may provide a UEFI OOB proxy 220 with status updates associated with the progress of the update and the result of the update, such as a success or failure of the firmware update. UEFI OOB proxy 220 may send the progress to service module UEFI proxy interface 212, which in turn may log the results of the firmware update. In an example, if the driver for the firmware update is no longer needed, UEFI OOB proxy 220 may unloaded the driver from UEFI environment 204. While the operations of service module UEFI proxy interface 212 and UEFI OOB proxy 220 have been described with respect to a firmware update for a PCIe device, the communication between the service module UEFI proxy interface and the UEFI OOB proxy may be similar for any pre-boot operations that require a driver or application to be loaded within UEFI environment 204 o information handling system 200.

In an example, in response to receiving the results of a requested operation, such as the firmware update described above, management controller 202 may wait until another request is received from UEFI OOB proxy 220. In certain examples, the communication between service module UEFI proxy interface 212 and UEFI OOB proxy 220 may be substantially similar for the next operation performed within the UEFI environment 204.

Referring now to FIG. 3, information handling system 200 includes those components described above with respect to FIG. 2 according to at least one embodiment of the current disclosure. For example, while not shown in FIG. 3, management controller 202 includes service module 210 and service module UEFI proxy interface 212 as shown in FIG. 2. Management controller 202 further includes a read fixed module 320 and a memory address directory 322. UEFI environment 204. While not shown in FIG. 3, UEFI environment 204 includes UEFI OOB proxy 220, FMP 222, and data archive 224 as shown in FIG. 2. UEFI environment 204 further includes UEFI/BIOS 330, a server memory 332, and a database 340. Server memory 332 includes multiple memory partitions including, but not limited to, drivers for operation partition 334 and a starting UEFI application partition 336. In an example, UEFI environment 204 may be located within any suitable information handling system, such as a server in communication with management controller 202.

During operation, service module UEFI proxy interface 212 may determine a component, such as a shared memory, to pass the required details for an operation to UEFI environment 204. Based on the communication component available between management controller 202 and UEFI environment 204 of a server, UEFI/BIOS application 330 may provide a service that routes traffic to/from an appropriate device for update. In an example, a current operation may be altered to provide tailored sets of drivers and an application for more efficient loading and execution. For example, service module UEFI proxy interface 212 may encapsulate data to identify a memory path for a requested operation within a data stream transmitted from management controller 202 to UEFI/BIOS 330. UEFI application 330 may provide a device interface, such as UEFI OOB proxy 220 in FIG. 2, that may not be available in management controller 202. In an example, management controller 202 may be a sole controller of operation and tracking of pre-boot operations within information handling system 200.

In certain examples, drivers for operation partition 334 of server memory 332 may be pre-loaded with a minimal amount of data or drivers, such as drivers to start pre-boot operations within information handling system 200. In an example, any other drivers for operations to be performed by UEFI/BIOS 330 may be requested by UEFI OOB proxy 220, a memory data path may be received from management controller 202, the UEFI OOB proxy may load or store the driver in drivers for operation partition 334. In this example, a location of a particular driver or application may be stored in memory address directory 322 and read fixed module 320 may retrieve the memory address for the driver or application from the memory address directory. In certain examples, the memory address for the driver may point to any suitable memory in information handling system 200, such as a shared memory managed by management controller 202 or the like.

During an initialize of information handling system 200, UEFI/BIOS 330 may request proxy support for a firmware volume (FV) and for UEFI OOB proxy 220. For example, UEFI OOB proxy 220 may send a request service module UEFI proxy interface 212 for the required drivers/applications. Based on these requests, management controller 202, via service module UEFI proxy interface 212, may respond to the requests. For example, service module UEFI proxy interface 212 may share the stored path details, such as/uefi/ssmboot, via read fixed module 320. In an example, UEFI/BIOS 204 may include FileSystem (FS) objects for the operation in a support package, such as a Virtual File System (VFS) with one or more volumes. In certain examples, the VFS may be database 340, which may be stored within a memory of management controller 202 but may be mapped as a VFS in the UEFI environment 204 as shown in FIG. 3.

In response to receiving the stored path details, UEFI OOB proxy 220 may retrieve the required drivers/applications from the shared path, such as/uefi/ssmboot, which may be located within a storage area managed by management controller 202. In an example, the driver located at the shared path/uefi/ssmboot may be any suitable driver, such as a driver that handles the SSM on UEFI 204. Based on the retrieved driver, FMP 222 may update a wrapper when FMP based updates need to be performed. However, if the driver is for a non-FMP device, other applications may be executed within UEFI environment 204. In an example, all retrieved drivers/applications may be stored within starting UEFI application partition 336 before being executed by UEFI/BIOS 330. In response to the operation being performed UEFI OOB proxy 220 may provide the results to service module UEFI proxy interface 212, and the status of the operation may be stored within management controller 202. Based on a current operation being completed, UEFI OOB proxy 220 may determine whether the driver or application may be needed again and if not, the UEFI OOB proxy may unload the driver or application.

In certain examples, service module UEFI proxy interface 212 and UEFI OOD proxy 220 may provide a pre-boot communication interface between management controller 202 and UEFI environment 204 to improve information handling system 200. For example, the pre-boot communication may improve the execution time of pre-boot operation by loading and initializing as minimal amount of data, such as minimal drivers/application, as possible. The minimal amount of data loaded may further improve information handling system 200 by reducing an amount of time it takes to perform certain operations. Communication between service module UEFI proxy interface 212 and UEFI OOB proxy 220 may also improve information handling system by reducing memory consumption in UEFI environment 204 by loading only the required UEFI drivers/applications.

Figure 4:
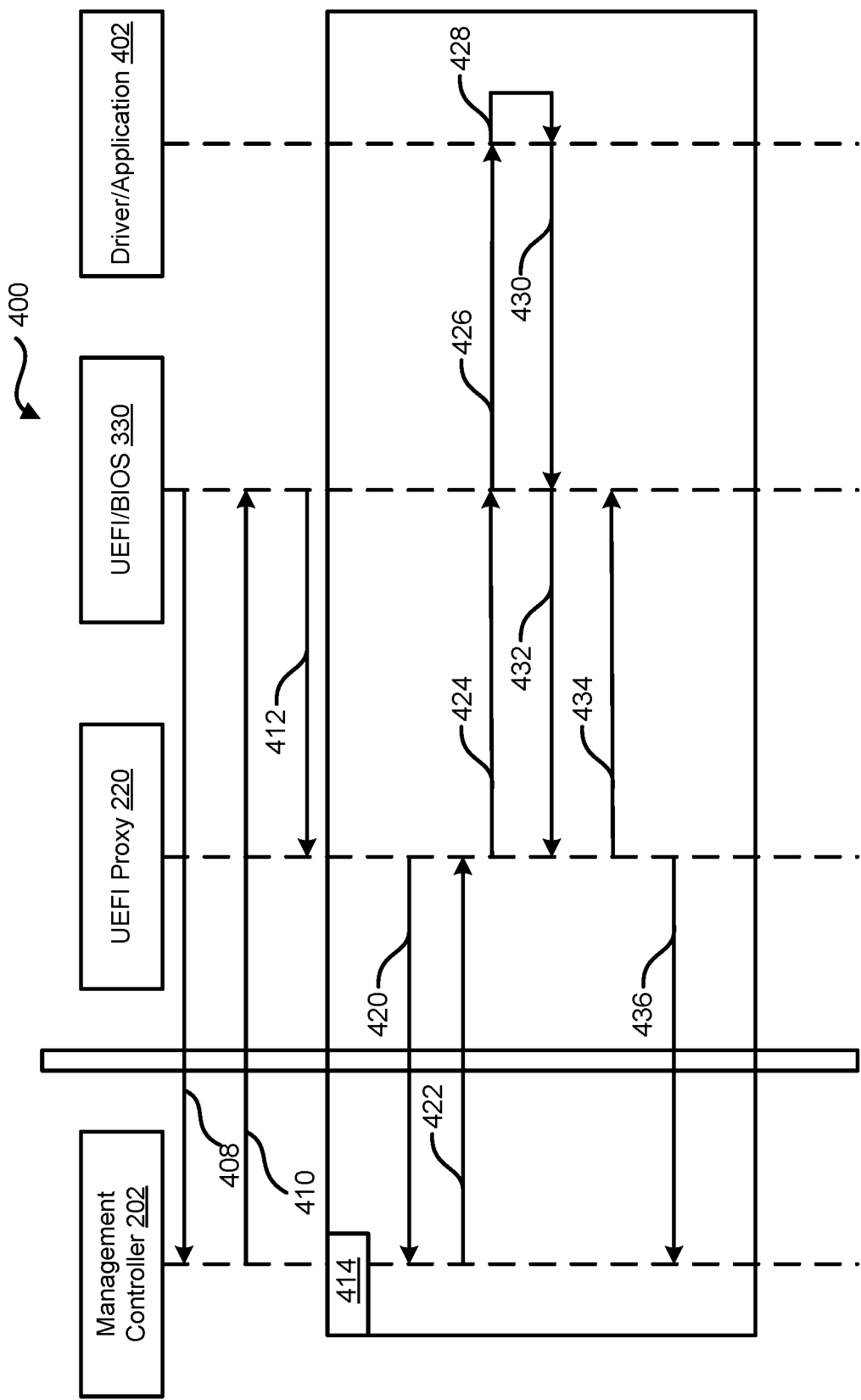
FIG. 4 is a flow diagram of a method for loading pre-boot drivers based on requests from a management controller within an information handling system, according to at least one embodiment of the present disclosure.

FIG. 4 illustrates a flow of a method 400 for loading pre-boot drivers based on requests from a management controller within an information handling system according to at least one embodiment of the present disclosure, starting at operation 410. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by components within management controller 202, UEFI proxy 220, UEFI/BIOS 330, a driver/application 402, or any other type of controller, device, module, processor, or any combination thereof, operable to employ all, or portions of, the method of FIG. 4.

At operation 408, UEFI/BIOS 330 may communicate with management controller 202 to request that UEFI OOB proxy protocol driver 220 be loaded. In an example, based on the load request for UEFI OOB proxy driver 220, management controller 202 may provide a memory path for a proxy driver in a storage area accessible and managed by management controller 202 at operation 410. In response to the memory path, UEFI/BIOS 330 may load and execute UEFI proxy 220 at operation 412. After UEFI proxy 220 is loaded and running, a loop 414 of operations 420, 422, 424, 426, 428, 430, 432, 434, and 436 (420-436) may be executed by management controller 202, UEFI proxy 220, UEFI/BIOS 330, and driver/application 402. In an example, loop 414 may be initiated based on management controller 202 requested that a particular operation be performed by UEFI/BIOS 330.

At operation 420, UEFI proxy 220 may request a driver/application associated with the particular operation. Based on the request from UEFI proxy 220, management controller 202 may provide the driver/application in any suitable manner at operation 422. For example, management controller 202 may provide a memory path to a memory location for the driver/application in a shared memory. At operation 424, UEFI proxy 220 may retrieve and load the driver/application in UEFI/BIOS 330. In an example, the driver/application may be stored or loaded in a server memory mapped to UEFI/BIOS 330.

At operation 426, UEFI/BIOS 330 may run the loaded driver/application. At operation 428, driver/application 402 may execute the pre-boot functions/code. At operation 430, driver/application 402 may provide an execution status to UEFI/BIOS 330. At operation 432, UEFI/BIOS 300 may provide the execution status to UEFI proxy 220. In an example, the execution status may be any suitable status updates, such as real time updates, a final pass/fail result, or the like. At operation 434, if the driver is no longer needed, UEFI proxy 220 may unload the driver/application 402 from UEFI/BIOS 330. At operation 436, UEFI proxy 220 may provide the execution status to management controller 202.

Figure 5:
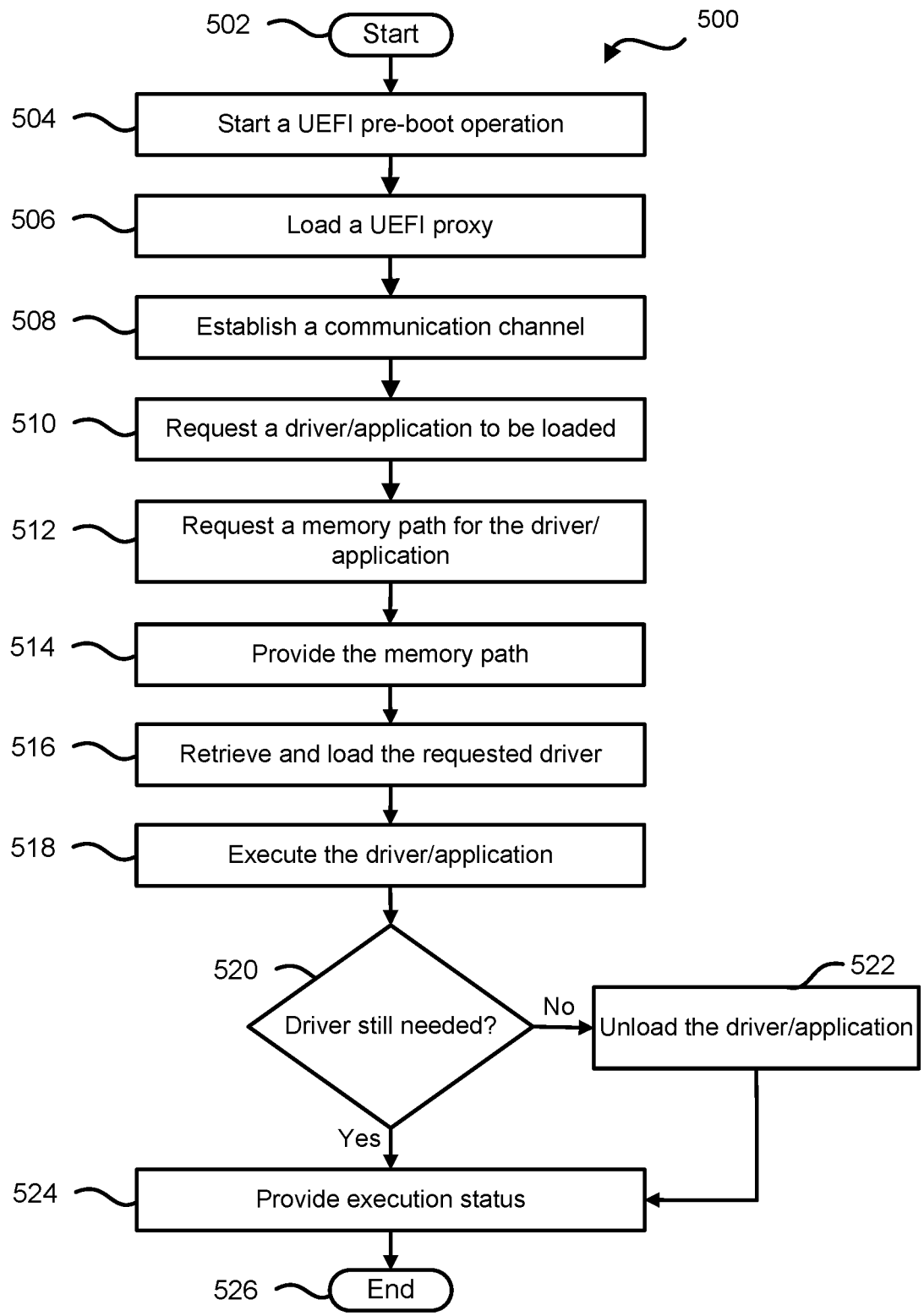
FIG. 5 is a flow diagram of another method for loading pre-boot drivers based on requests from a management controller within an information handling system according to at least one embodiment of the present disclosure.

FIG. 5 illustrates a flow diagram of a method 600 for loading pre-boot drivers based on requests from a management controller within an information handling system according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, management controller 202, service module UEFI proxy interface 212, UEFI OOB proxy 220, UEFI/BIOS 330, or any other type of controller, device, module, processor, or any combination thereof, operable to employ all, or portions of, the method of FIG. 5.

At block 504, a Unified Extensible Firmware Interface (UEFI) pre-boot operation is started. At block 506, a UEFI proxy is loaded within the UEFI. In certain examples, the UEFI may pre-loaded with only a minimum amount of drivers/applications to enable the UEFI proxy to be loaded and executed. In an example, the UEFI proxy may be any suitable proxy to communicate with a management controller of the information handling system. For example, the UEFI proxy may be a UEFI OOB proxy to communicate with a service module UEFI proxy interface of the management controller. At block 508, a communication channel is established between the management controller and the UEFI. In an example, the communication channel may be established between the service module UEFI proxy interface and the UEFI proxy. In certain examples, the UEFI proxy interface may pre-loaded on the management controller, and the UEFI proxy interface may provide out-of-band communications with the UEFI proxy.

At block 510, a driver/application associated with an operation to be performed in the UEFI is requested. At block 512, the UEFI proxy requests a memory path for the driver/application. At block 514, the memory path for the driver/application is provided to the UEFI proxy. In certain examples, the memory path may be provided by the UEFI proxy of the management controller. In an example, the memory path may be one of multiple memory paths stored in a memory of the management controller.

At block 516, the requested driver/application is retrieved and loaded. In an example, the UEFI proxy may utilize the memory path to retrieve the requested driver/application. At block 518, the loaded driver/application is executed. At block 520, a determination is made whether the driver/application will be needed later in the pre-boot operation. Based on the driver/application no longer being needed, the driver/application is unloaded at block 522, and an execution status of the driver/application is provided at block 524. If the driver/application is still needed, the execution status is provided without unloading the driver/application at block 524 and the method ends at block 526. In an example, the execution status may be any suitable status updates, such as real time updates, a final pass/fail result, or the like.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a Unified Extensible Firmware Interface (UEFI); and
 a management controller to communicate with the UEFI, the management controller to:
  establish a communication channel with the UEFI; and
  provide a memory path associated with a driver associated with an operation to be performed in the UEFI;

wherein the UEFI to:
  based on the memory path, receive the requested driver from a memory associated with the UEFI;
  load the requested driver;
  execute the loaded requested driver;
  provide an execution status for the executed driver to the management controller;
  determine whether the executed driver will be needed later in the pre-boot operation; and
  in response to the executed driver no longer being needed, unload the executed driver from the UEFI.

2. The information handling system of claim 1, wherein prior to the requesting of driver associated with an operation to be performed in the UEFI:
  the management controller to load a UEFI proxy within the UEFI; and
  the UEFI to execute the UEFI proxy, wherein the UEFI proxy is utilized as the communication channel between the management controller and the UEFI to load specific driver during the pre-boot operation.

3. The information handling system of claim 2, wherein the UEFI is pre-loaded with only a minimum amount of driver or applications to enable the UEFI proxy to be loaded and executed.

4. The information handling system of claim 2, wherein the management controller includes a UEFI proxy interface, the UEFI proxy interface to communicate with the UEFI proxy to interface between the management controller and the UEFI to load only particular driver during the pre-boot operation.

5. The information handling system of claim 4, wherein the UEFI proxy interface is pre-loaded on the management controller, and the UEFI proxy interface provides out-of-band communications with the UEFI proxy.

6. The information handling system of claim 1, wherein the memory path is one of a plurality of memory paths stored in a memory of the management controller.

7. The information handling system of claim 6, wherein each of the memory paths point to a different data set within a memory archive of the UEFI.

8. A method comprising:
  during a Unified Extensible Firmware Interface (UEFI) pre-boot operation:
    establishing a communication channel between a management controller of an information handling system and a UEFI of the information handling system;
    requesting a driver associated with an operation to be performed in the UEFI;
    providing, by the management controller, a memory path associated with the requested driver;
    based on the memory path, receiving the requested driver from a memory associated with the UEFI;
    loading the requested driver;
    executing, by the UEFI, the loaded requested driver;
    providing an execution status for the executed driver to the management controller;
    determining whether the executed driver will be needed later in the pre-boot operation; and
    in response to the executed driver no longer being needed, unloading the executed driver from the UEFI.

9. The method of claim 8, wherein prior to the requesting of driver associated with an operation to be performed in the UEFI, the method further comprises:
  loading, by the management controller, a UEFI proxy within the UEFI; and
  executing, by the UEFI, the UEFI proxy, wherein the UEFI proxy is utilized as the communication channel between the management controller and the UEFI to load specific driver during the pre-boot operation.

10. The method of claim 9, wherein the UEFI is pre-loaded with only a minimum amount of driver or applications to enable the UEFI proxy to be loaded and executed.

11. The method of claim 9, wherein the method further comprises communicating, by a UEFI proxy interface of the management controller, with the UEFI proxy to interface between the management controller and the UEFI to load only particular driver during the pre-boot operation.

12. The method of claim 11, wherein the UEFI proxy interface is pre-loaded on the management controller, and the UEFI proxy interface provides out-of-band communications with the UEFI proxy.

13. The method of claim 8, wherein the memory path is one of a plurality of memory paths stored in a memory of the management controller.

14. The method of claim 13, wherein each of the memory paths point to a different data set within a memory archive of the UEFI.

15. An information handling system comprising:
  a Unified Extensible Firmware Interface (UEFI) pre-boot environment including:
    a server memory pre-loaded with a first plurality of drivers to start a boot operation of the information handling system; and
    a UEFI to perform the boot operation; and
  an out-of-band management controller including:
    a management controller memory to store a plurality of memory paths; and
    a management controller to communicate with the UEFI, the management controller to:
      establish a communication channel with the UEFI via a UEFI proxy interface of the management controller and a UEFI proxy of the UEFI; and
      provide a memory path associated with a driver associated with an operation to be performed in the UEFI;
  wherein the UEFI to:
    based on the memory path, receive the requested driver from a memory associated with the UEFI;
    load the requested driver;
    execute the loaded requested driver;
    provide a status for the executed driver to the management controller;
    determine whether the executed driver will be needed later in the pre-boot operation; and
    in response to the executed driver no longer being needed, unload the executed driver from the UEFI.

16. The information handling system of claim 15, wherein the UEFI proxy interface is pre-loaded on the management controller, and the UEFI proxy interface provides out-of-band communications with the UEFI proxy.

17. The information handling system of claim 15, wherein the requested driver is loaded based on the requested driver being stored in the server memory.

18. The information handling system of claim 15, wherein each of the memory paths point to a different data set within a memory archive of the UEFI.

* * * * *